(12) United States Patent    (10) Patent No.: US 12,700,117 B2
Devitt et al.    (45) Date of Patent: Aug. 4, 2026

(54) DEPTH DETERMINATION SYSTEM AND METHOD

(71) Applicant: Compound Eye, Inc., Redwood City, CA (US)

(72) Inventors: Jason Devitt, Redwood City, CA (US); Zachary Flom, Redwood City, CA (US)

(73) Assignee: Compound Eye, Inc., Redwood City, CA (US)

( * ) Notice: Subject to any disclaimer, the term of this patent is extended or adjusted under 35 U.S.C. 154(b) by 0 days.

(21) Appl. No.: 19/416,494

(22) Filed: Dec. 11, 2025

(65) Prior Publication Data

US 2026/0162290 A1    Jun. 11, 2026

Related U.S. Application Data

(60) Provisional application No. 63/730,931, filed on Dec. 11, 2024.

(51) Int. Cl.
*G06T 7/55*    (2017.01)

(52) U.S. Cl.
CPC ...... *G06T 7/55* (2017.01); *G06T 2207/10148* (2013.01); *G06T 2207/20081* (2013.01); *G06T 2207/20084* (2013.01); *G06T 2207/30252* (2013.01)

(58) Field of Classification Search
CPC ............. G06T 7/55; G06T 2207/10148; G06T 2207/20081; G06T 2207/20084; G06T 2207/30252
USPC ....................................................... 382/106
See application file for complete search history.

(56) References Cited

U.S. PATENT DOCUMENTS

2023/0386063 A1* 11/2023 Yang ....................... G06T 7/593
2025/0299351 A1* 9/2025 Zeng ......................... G06T 7/55

FOREIGN PATENT DOCUMENTS

CN    115018898 A * 9/2022 ............... G06N 3/08

OTHER PUBLICATIONS

Facil, et al., "CAM-Convs: Camera-Aware Multi-Scale Convolutions for Single-View Depth", arXiv:1904.02028v1, https://doi.org/10.48550/arXiv.1904.02028, Apr. 3, 2019.
Hu, et al., "Metric3D v2: A Versatile Monocular Geometric Foundation Model for Zero-shot Metric Depth and Surface Normal Estimation", arXiv:2404.15506v4, https://doi.org/10.48550/arXiv.2404.15506, Jan. 3, 2025.
Tateno, et al., "CNN-SLAM: Real-time dense monocular SLAM with learned depth prediction", 2017 IEEE Conference on Computer Vision and Pattern Recognition (CVPR), 10.1109/CVPR.2017.695, pp. 6565-6574, Year: 2017.
Yin, et al., "Metric3D: Towards Zero-shot Metric 3D Prediction from a Single Image", 2023 IEEE/CVF International Conference on Computer Vision (ICCV), 10.1109/ICCV51070.2023.00830, pp. 9009-9019, Year: 2023.

* cited by examiner

*Primary Examiner* — Jennifer Mehmood
*Assistant Examiner* — Pardis Sohraby
(74) *Attorney, Agent, or Firm* — Jeffrey Schox; Diana Lin

(57) ABSTRACT

A system and method for dense depth map determination from image data, including: predicting a standard disparity map for the image using a standard disparity model based on the image; and converting the standard disparity map to a depth map using a focal length in pixels associated with the image.

18 Claims, 6 Drawing Sheets
(3 of 6 Drawing Sheet(s) Filed in Color)

DEPTH DETERMINATION SYSTEM AND METHOD

CROSS-REFERENCE TO RELATED APPLICATIONS

This application claims the benefit of U.S. Provisional Application No. 63/730,931 filed 11 Dec. 2024, which is incorporated in its entirety by this reference.

TECHNICAL FIELD

This invention relates generally to the depth estimation field, and more specifically to a new and useful depth from monocular image estimation method in the depth estimation field.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The following description of the embodiments of the invention is not intended to limit the invention to these embodiments, but rather to enable any person skilled in the art to make and use this invention.

1. Overview

Figure 1:
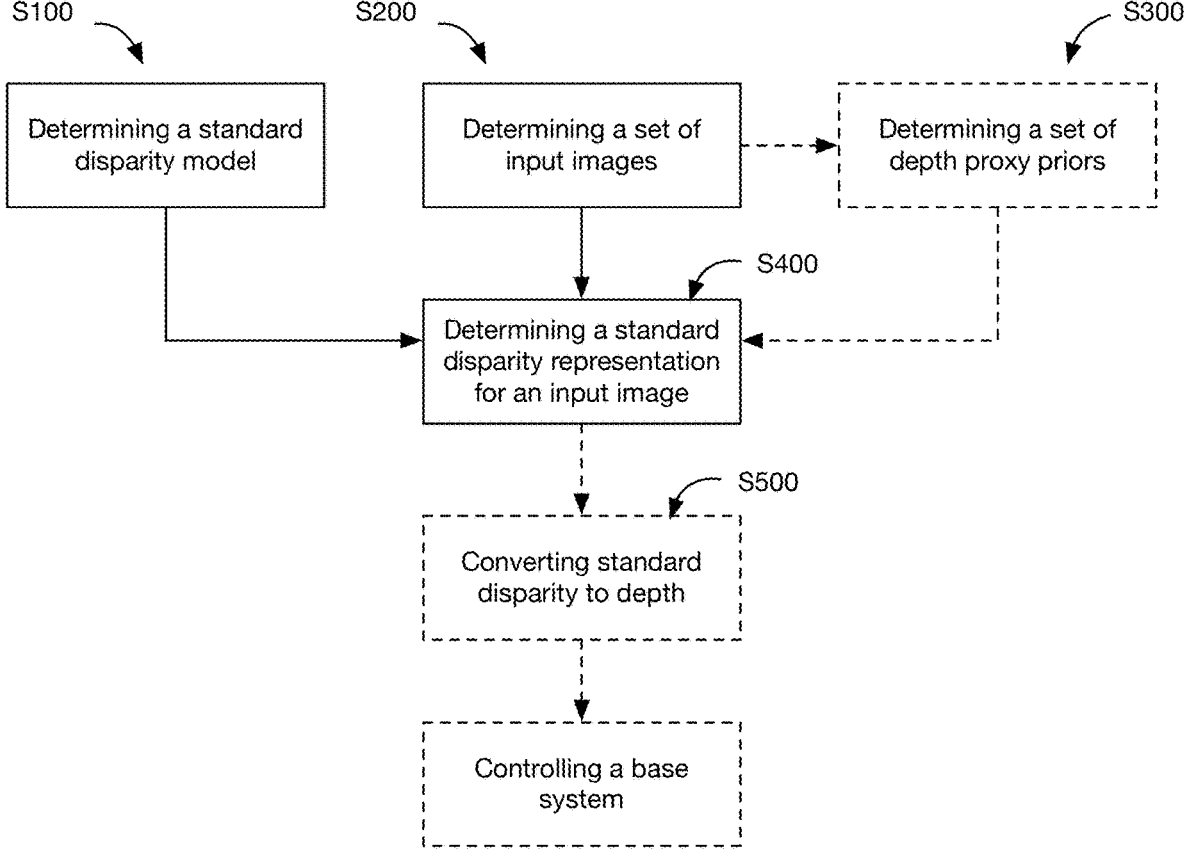
FIG. 1 is a schematic representation of a variant of the method.

As shown in FIG. 1, variants of the method can include: optionally determining a standard disparity model S100; determining a set of input images S200; optionally determining a set of depth proxy priors S300; determining a standard disparity representation for an input image S400; and converting standard disparity to depth S500. The method functions to determine depth data based on an image.

In an illustrative example, the method can include: determining a set of input images wherein images within the set are sampled by cameras with differing focal lengths (e.g., in pixels) and/or pixel sizes; optionally determining a depth prior (e.g., sparse depth values, sparse standard disparity values, etc.) for one or more of the input images; for each input image of the set, predicting a standard disparity map based on the input image and optionally the respective depth prior using the same standard disparity model (e.g., for all input images; converting the determined standard disparity map to a depth map (e.g., by scaling the inverse standard disparity at each pixel by the focal length in pixels of the camera that sampled the input image; by dividing the focal length in pixels by the standard disparity value for each point in the standard disparity map; etc.); and optionally post-processing the depth map to reverse any preprocessing performed on the input image (e.g., to center the principal point).

In another illustrative example, training the standard disparity model can include: determining a training data set including a set of training images (e.g., monocular images) paired with dense depth maps of shared scenes, wherein each image is associated with a known focal length (e.g., in pixels) of the respective sampling camera (e.g., wherein different images can be associated with different focal lengths); determining a target standard disparity map for each training image based on the respective dense depth map by scaling an inverse depth (e.g., at each pixel) by the respective known focal length associated with the image; predicting a standard disparity map (e.g., in pixel units) for each training image using the standard disparity model; comparing the predicted standard disparity map and the computed target standard disparity map associated with each image; and updating the standard disparity model based on the comparison. In examples, the target standard disparity map can be determined by: determining a ground-truth depth map paired with each training image; determining the focal length (e.g., in pixels) used to capture each training image; and multiplying an inverse of the depth at each point within the ground-truth depth map by the focal length (e.g., in pixels) of the respective training image and optionally a 1 meter baseline. However, the target standard disparity map can be otherwise determined. Training the standard disparity model can optionally include: determining a physical training derivative of depth (e.g., surface normals, vanishing lines, etc.), wherein the physical training derivative of depth is independently determined from the dense depth maps; independently predicting the physical derivative of depth based on the training image using the standard disparity model; comparing the predicted physical derivative of depth and the physical training derivative of depth for each image and/or derivative of the predicted standard depth map (e.g., the gradient of the predicted standard depth map) and the predicted physical derivative of depth; and updating the standard disparity model based on the comparison(s).

However, the system and/or method can be otherwise performed.

2. Technical Advantages

Variants of the technology can confer one or more advantages over conventional technologies.

Figure 5:
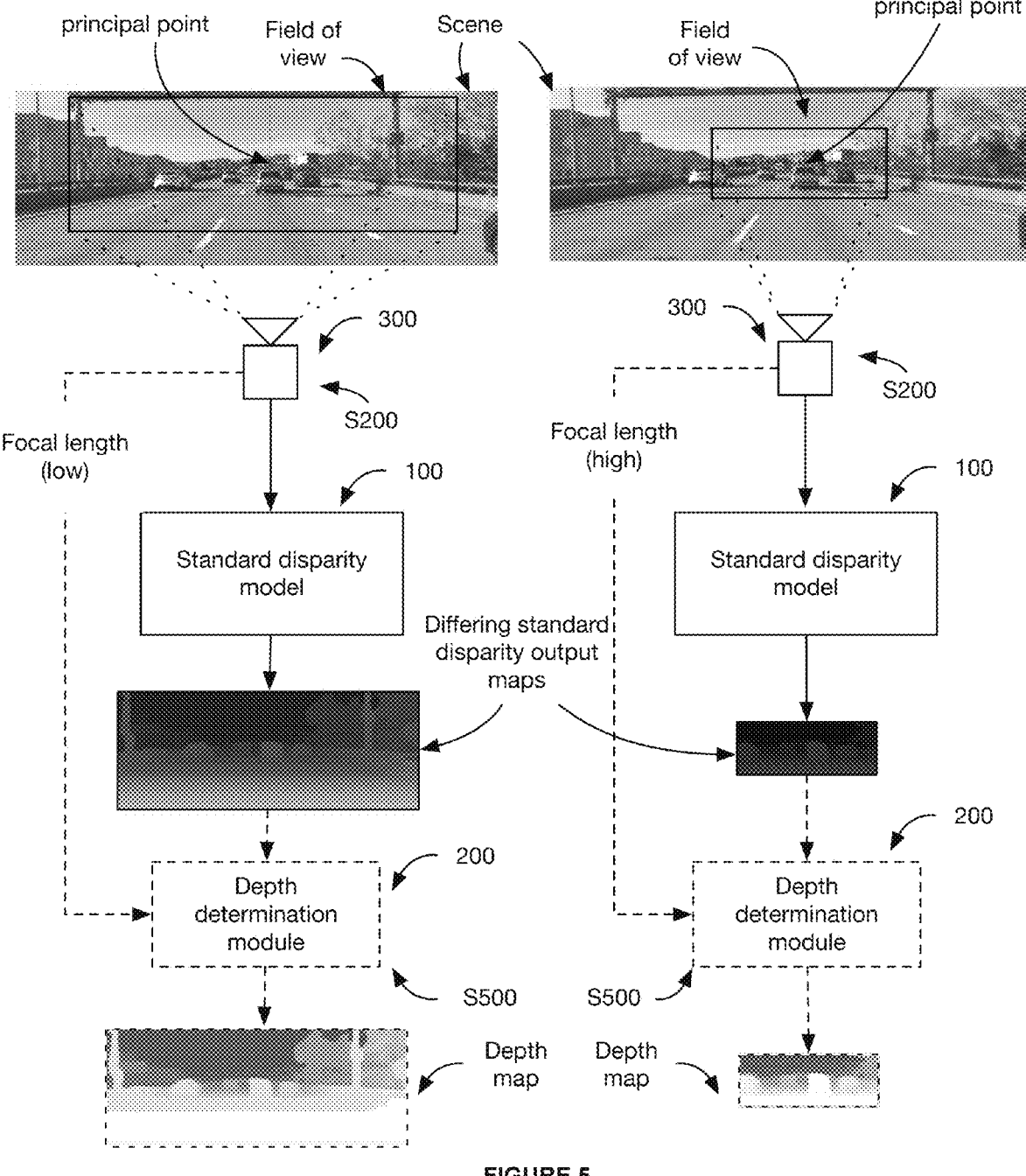
FIG. 5 is an illustrative example of a variant determining a standard disparity and depth for the input image for two input images captured by cameras with different parameters.
Figure 6:
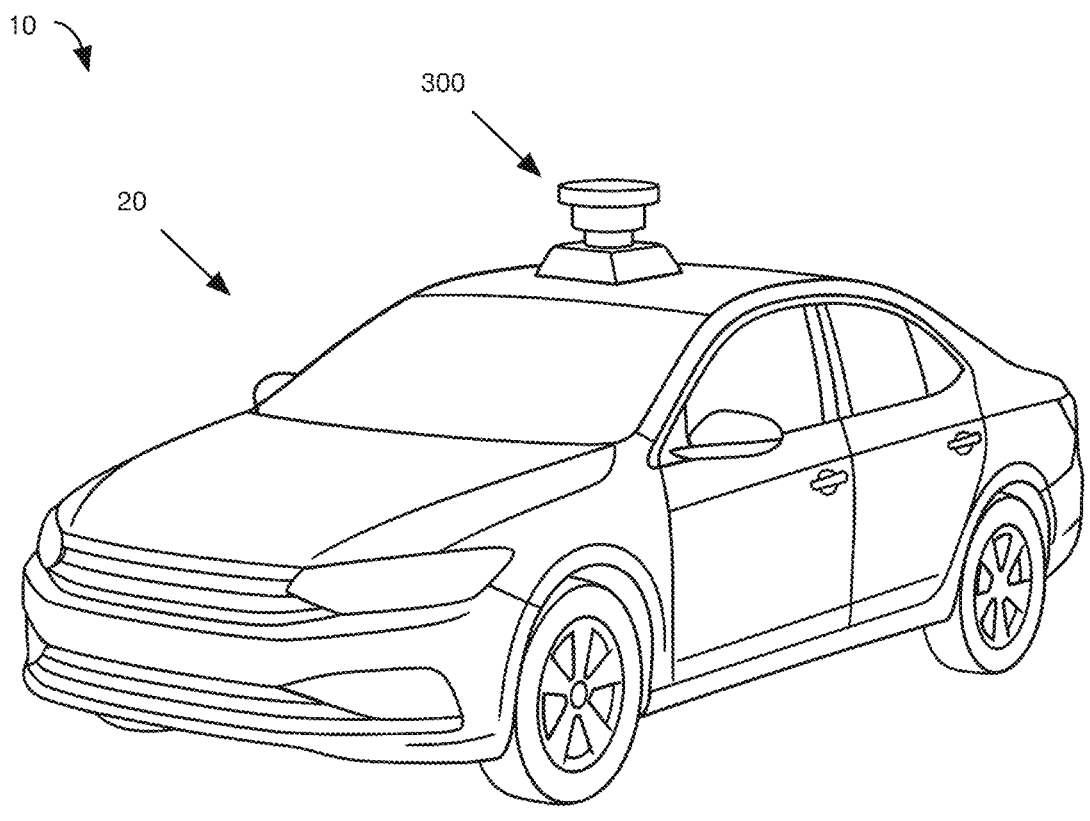
FIG. 6 is an illustrative example of a physical system.

First, variants of the technology can enable generalized image-based depth estimation by training a generalized model to predict standard disparity (e.g., a depth proxy that is independent of focal length; a depth proxy that is inverse depth normalized by and/or scaled by the focal length; etc.) instead of depth, then by scaling the standard disparity back into depth using the known focal length (e.g., example shown in FIG. 5). This enables the generalized model (e.g., standard disparity model) to be agnostic to different camera parameters (e.g., focal length, pixel size, etc.) used to sample the images (e.g., support a heterogeneous camera set), which can enable a larger set of images to be used for training.

Second, in variants, the model can be further generalized and/or the method can be further streamlined by using standard disparity determined using the image sensor's focal length in pixels (e.g., an intrinsic parameter) instead of image sensor's focal length in meters (e.g., a physical optical property). This can enable calibration-independent training, remove metric ambiguity, eliminate post-processing steps to resolve depth scaling issues, and/or confer other benefits.

Third, in variants, the generalized model can be more accurate than conventional depth prediction models. In a first example, the generalized model can be more accurate by training against standard disparity, which can reduce noise in the resultant depth representation, because error is roughly normally distributed in standard disparity space (e.g., gaussian) and not normally distributed in depth. Thus, by using standard disparity for optimization, depth errors on distant features have relatively lower weight for the same absolute difference in depth than depth errors proximal the camera, which can increase the accuracy of an optimized depth or standard disparity output for scenarios where nearby depth estimations require higher precision than distant depth estimations. In a second example, the generalized model can be more accurate by training against auxiliary tasks (e.g., in addition to the main task of predicting a standard disparity map). For example, the generalized model can be trained to independently predict a derivative of the standard disparity (e.g., using a consistency constraint between the independently-predicted derivative and a derivative of the predicted standard disparity map; using a comparison between independently-predicted derivative and an independently-sampled training target; etc.).

Fourth, variants of the technology can determine depth maps from monocular imagery. This can enable the technology to be applied to more use cases, since depth can be predicted without using tightly-calibrated stereocameras, active depth sensors (e.g., LiDAR, RADAR, etc.), and/or other secondary sensors. In variants, the technology can additionally accommodate for image preprocessing by reversing the preprocessing steps on the standard disparity map and/or depth map. For example, the input images can be preprocessed to center the principal point in the image frame, wherein the resultant depth map can be post-processed to reverse the principal point centering processes.

Fifth, variants of the technology can determine a dense depth map (e.g., with a depth value for all or almost all pixels in the image), which can provide complete geometric representations of the ambient environment, provide pixel-level correspondence of depth to color, provide more robust inputs for downstream processes, and/or provide other benefits.

Sixth, variants of the technology can reverse the image preprocessing processes on the resultant standard disparity map and/or depth map, which can enable the resultant depth map to be better aligned with the raw (e.g., unprocessed) image.

However, further advantages can be provided by the system and method disclosed herein.

3. System

In variants, the system can include: a standard disparity model 100; a depth determination module 200; a set of sensors 300; and an optional training data generation module.

The system functions to determine a depth map based on an input image. In an example, the system functions to determine dense depth maps from different images sampled using different focal lengths (e.g., in pixels), using the same standard disparity model. The system can optionally function to control a base system (e.g., robot, vehicle, etc.) using the determined depth map (e.g., for perception, planning, navigation, control, mapping, etc.).

The system can be used with standard disparity, depth, surface normals, and/or any other information.

The standard disparity can function as a depth proxy (e.g., for a pixel). The standard disparity (e.g., normalized inverse depth, normalized depth proxy, depth proxy, idealized disparity, ideal disparity, focal-normalized inverse depth, focal-scaled inverse depth (FSID), focal length over depth (FoD), etc.) is preferably a calibration-independent proxy that normalizes out the camera-specific parameters (e.g., focal length parameters), but can be otherwise defined. The standard disparity is preferably affine invariant but can additionally or alternatively be affine-covariant and/or otherwise configured.

In an example, the standard disparity can be a proxy for the depth or distance of the physical scene from the image sensor that sampled a corresponding appearance-based image. In a first specific example, the standard disparity can be a proxy for the depth of the physical scene region depicted by a pixel in the image. In a second specific example, the standard disparity can be converted to depth by scaling the standard disparity value by the focal length (e.g., in pixels) of the camera sampling the input image (e.g., base image).

The standard disparity can preferably be determined based on depth (Z) and focal length (f) of the image sensor (e.g., camera) sampling the input image, but can additionally or alternatively be determined based on a standard baseline (b) (e.g., a standard baseline of 1 m) and/or any other information. The focal length can preferably be in pixels, but can additionally or alternatively be in metric scale (e.g., meters) and/or any other unit. In variants, the inventors have discovered that using focal length in pixels can be advantageous because this enables the standard disparity (d) to encode the pixel size of the camera, which enables the resultant standard disparity to be normalized across cameras with different focal lengths and pixel sizes.

The standard disparity is preferably in units of image space over metric scale (e.g., pixels/meters), but can alternatively have any other set of units. In an example, the standard disparity can preferably be disparity in pixel units, but can alternatively be in distance units (e.g., meters), or in any other suitable unit. In variants, when the standard disparity is in pixel units, the focal length of the camera (f) can also be in pixel units (e.g., pixel-represented focal length). When focal length is in meters or another unit of length, focal length can be converted to pixels by using the pixel size in distance units (p) according to the following equation: $f_{pixels} = f_{meters}/p$. Furthermore, in variants, (u,v,d) (e.g., where u and v are pixel coordinates, and d is standard disparity) is a vector in vector space, and can be: provided as an input to other algorithms that perform vector operations (e.g., structure-from-motion algorithms, optical flow methods, etc.); optimized (e.g., using vector optimization methods); and/or otherwise transformed.

The standard disparity can preferably be inversely proportional to depth (Z), but can be otherwise proportional to depth.

The standard disparity can preferably be directly proportional to focal length (e.g., in pixels, in unit length, etc.), but can additionally or alternatively be otherwise proportional to focal length.

In a first variant, the standard disparity can be inverse depth scaled by the focal length.

In a second variant, the standard disparity (d) can be defined by: $d = f/Z$, where f is focal length (e.g., in pixels) and Z is depth.

In a third variant, the standard disparity can represent the pixel displacement that would occur if an imaginary camera were positioned one meter away from the current camera in a stereo setup, and can be the disparity value that would be measured with a unit baseline of one meter (e.g., b=1), providing a standardized reference frame independent of actual camera configuration. In this variant, the standard disparity can be defined by:

$$d = \left(\frac{f}{Z}\right) \times b.$$

In a specific example, the standard disparity at every pixel $u=[u,v,1]^T$ can be defined as $d(u,v)=f/Z(u,v)$ where $(u,v)$ define the image coordinates.

In a fourth variant, the standard disparity can be the disparity that would have been induced at each pixel if the camera was part of a rectified stereo camera pair with a baseline b (e.g., inter-camera distance) of one meter.

However, the standard disparity can be otherwise defined.

The depth functions to represent the physical environment geometry. In an example, the depth can represent the distance of the physical scene region from the image sensor that sampled a corresponding appearance-based image. In a specific example, the depth can be the depth of the physical scene region depicted by a pixel in the image.

The depth is preferably in units of metric scale (e.g., meters) but can additionally or alternatively be in any other unit.

The depth can be directly measured, inferred, computed, predicted, and/or otherwise determined.

In a first variant, the depth can be determined from standard disparity. In examples, the method can use this variant for depth determination during runtime or inference. However, other variants can alternatively be used. In a first example, the depth can be determined by scaling the inverse disparity by the focal length of the image sensor sampling the image. In a second example, the depth can be determined by computing the depth (Z) using: Z=f/d, where f is the focal length (e.g., in pixels) and d is the standard disparity value. In a third example, the depth can be determined by computing the depth from the standard disparity using stereo methods assuming a baseline of 1 meter. In a fourth example, scale depth (e.g., in meters) can be determined based on the standard disparities determined for an input image by multiplying focal length of the camera which captured the image, the inverse of standard disparity, and a known or standard baseline (e.g., in distance units, a 1 meter baseline, etc.) according to the following equation:

$$Z = \left(\frac{f}{d}\right) \times b.$$

In a second variant, the depth is measured. In examples, the method can use this variant for depth determination during training data generation. However, other variants can alternatively be used. The depth is preferably measured using a depth sensor, but can be otherwise measured. The depth sensor can preferably be calibrated to the image sensor, but can alternatively be uncalibrated and aligned with the image sensor after measurement. The depth can be: directly measured; geometrically inferred (e.g., using geometric depth estimation, etc.); and/or otherwise determined. The depth can be directly measured using LiDAR, ToF, structured light, active stereo, and/or any other direct measurement methods. The depth can be geometrically inferred using stereo, structured light, SLAM, multi-view geometry, and/or any other geometric inference methods.

In a third variant, the depth can be simulated. In an example, the depth at each point in a synthetic image can be sampled from the same synthetic scene (e.g., 3D virtual scene).

In a fourth variant, the depth can be predicted using a trained model. In an example, the depth can be predicted from one or more images, depth priors, and/or any other prediction inputs.

However, the depth can be otherwise defined and/or determined.

The surface normals function to represent the local geometry (e.g., surface orientations) of each of a set of regions. The surface normals and/or derivatives thereof (e.g., standard disparity gradient, vanishing lines, etc.) can be used: as a training target or consistency check for standard disparity model training, for base system operation (e.g., for perception, planning, actuation, etc.), and/or otherwise used.

In a first variant, the surface normals can be directly measured from the scene (e.g., independently measured form depth).

In a second variant, the surface normals can be determined from the depth data. In a first example, the set of surface normals can be computed from depth gradients in image space using sobel filters, finite differences, central differences, and/or otherwise computed. In a second example, the set of surface normals can be computed in perspective space by converting each pixel to a 3D point (e.g., using focal length in meters), then computing the normal between neighboring points. The In a third variant, the surface normals can be determined from standard disparity. In a first example, the set of surface normals can be computed from a standard disparity map by first converting each standard disparity value d(u,v) at pixel coordinates (u,v) into depth Z(u,v) using the camera intrinsics (e.g., focal length in pixels f and optionally baseline b) according to Z(u,v)=(f·b)/d(u,v), back-projecting each pixel into a 3D point in the camera frame, and then estimating a local plane normal from neighboring 3D points using finite differences, central differences, or local least-squares plane fitting in 3D.

In a second example, for approximately planar regions associated with a vanishing line in the image, the set of surface normals can be estimated directly in standard disparity space by fitting a plane model to the standard disparity values that is constrained by the vanishing line geometry, then using the fitted plane parameters as the surface normal for that region.

However, the surface normal can be otherwise defined and/or determined.

However, the system can be used with any other set of information.

The standard disparity model 100 functions to predict a depth proxy map (e.g., standard disparity) from a set of inputs (e.g., a monocular image, optional standard disparity prior, etc.).

The standard disparity model 100 (e.g., normalized inverse depth model, normalized depth proxy model, depth proxy model, idealized disparity model, focal-normalized inverse depth model, focal-scaled inverse depth model, focal length over depth model, etc.) is preferably a generalized model that is agnostic to image sensor calibration parameters (e.g., focal lengths, principal points, etc.), pixel sizes, image sensor type, scale, and/or otherwise generalized, but can alternatively be specific to a calibration parameter value (e.g., a focal length value), image sensor type, and/or otherwise constrained.

The standard disparity model can output depth proxies, surface normal proxies, a set of confidence or uncertainty scores, region segments (e.g., image segments, depth segments, masks, etc.), depth, surface normals, semantic segmentation, optical flow (e.g., scene flow, disparity flow, etc.), and/or any other information about the scene.

The depth proxies can represent depth at one or more pixels of an input image. The depth proxies are preferably represented using a map, but can alternatively be a set of individual values or otherwise represented.

The depth proxies are preferably a dense map, but can alternatively be a sparse map. The dense map can include values for all or more than a threshold proportion of the image pixels (e.g., more than 80%, 90%, 95%, 99%, a majority, a supermajority, etc.), include a map where valued pixels are separated by less than a threshold number of non-valued pixels (e.g., less than 1, 2, 5, 10, and/or any other number of pixels, etc.), and/or be otherwise defined. The sparse map can include values for less than a threshold proportion of the image pixels (e.g., less than 50%, 45%, 35%, 20%, etc.), include a map where valued pixels are separated by more than a threshold number of non-valued pixels (e.g., more than 1, 2, 3, 5, 10, 20, and/or any other number of pixels, etc.), and/or be otherwise defined.

The depth proxies preferably include a depth proxy value for pixels of the image (e.g., image pixels), but can alternatively be determined for geometric units (e.g., points, voxels, etc.) corresponding to a set of image pixels, and/or any other set of units.

The depth proxy is preferably standard disparity (e.g., determined using focal length in pixels), but can alternatively be normalized depth (e.g., determined using focal length in metric scale), depth, and/or be any other depth proxy. The set of depth proxies for an image are preferably represented a standard disparity map (e.g., with standard disparity values corresponding to different image pixels). However, the depth proxy map can be a depth map (e.g., with depth values for the image pixels), and/or map of any other suitable depth proxy.

However, the depth proxies can be otherwise defined and/or determined.

The surface normal proxies can represent the surface normal at one or more pixels or regions of the input image. The surface normal proxies can be predicted by the standard disparity model during inference and/or training (e.g., as an auxiliary training task). During inference, the surface normal proxies can be used to refine surface geometry, improve map smoothness, improve object segmentation, determine stable grasp points, estimate slope or traversability, improve 3D reconstruction, estimate reflectance, and/or otherwise be used. During training, the surface normal proxies can be used to provide an additional loss for training, provide a physics-based constraint for training, and/or otherwise be used. The surface normal proxies are preferably represented as a map (e.g., with surface normal values corresponding to different image pixels), but can alternatively be a set of individual values. The surface normal proxies are preferably a dense map, but can alternatively be a sparse map. The surface normal proxies preferably include a surface normal proxy value for each unit of the depth proxy map (e.g., for each image pixel, for each point for each voxel, etc.), but can additionally and/or alternatively include a surface normal proxy for different units. The surface normal proxy can be:

a surface normal, a surface normal gradient, a set of vanishing lines, a set of planes, and/or any other surface normal proxy.

The set of confidence scores function to represent the prediction confidence of a predicted value or set thereof. The set of confidence scores can be for the entire map, for each pixel value, and/or for any other set of units. The set of confidence scores can be for the standard disparity, for the surface normal, and/or otherwise be configured.

However, the standard disparity model can generate any other set of outputs.

The inputs to the standard disparity model preferably includes a single image, but can additionally or alternatively include: multiple images, a depth proxy prior 410 (e.g., standard disparity prior), and/or other inputs.

The single image is preferably a monocular image (e.g., wherein the input image only includes a monocular image; the input image consists essentially of a monocular image, etc.), but can alternatively be a stereoimage, multiview image, and/or any other image. The images can be black and white, RGB, IR, and/or in any other wavelength or set thereof. The images are preferably 2D, but can alternatively be 2.5D, 3D, and/or have any other dimensionality.

The depth proxy prior 410 is preferably sparse, but can alternatively be dense. The depth proxy prior can be: a set of depth values (e.g., depth for a subset of the image pixels), a set of standard disparity values (e.g., focal-length scaled inverse depth for a subset of the image pixels), sparse depth hints, structure-from-motion tracks, key point-based parallax cues, planar-region hypotheses, ground-plane hypotheses, scene-class priors, object class priors, a set of geometric constraints (e.g., from segmentation), and/or any other depth proxy. The depth proxy prior can be: used to condition the standard disparity model, be provided in a side channel to the standard disparity model, used as an input to the standard disparity model, used as a check on the resultant standard disparity map or depth map (e.g., checking the predicted values at a given pixel to the depth prior value), and/or otherwise used.

In a first variant, the depth proxy prior can be directly measured (e.g., using LiDAR, RADAR, time of flight, projected light, etc.). In a second variant, the depth proxy prior is independently determined from the set of images. For example, the depth proxy prior can be determined using a SIDE model, a prior version of the standard disparity model 100, SfM, and/or otherwise predicted from the set of images. In a third variant, the depth proxy prior is manually determined. In a fourth variant, the depth proxy prior is fused from directly measured priors (e.g., LiDAR and stereo, optionally using per-pixel confidence or validity masks etc.). In a fifth variant, the depth proxy prior is estimated (e.g., using stereoscopic methods, SfM, optical flow, etc.). In a first example of the fifth variant, the monocular image can be an image from an image pair used to determine the depth proxy prior. In a second example of the fifth variant, the depth proxy prior can be determined using the methods disclosed in U.S. application Ser. No. 16/936,269 filed Jul. 22, 2020, U.S. application Ser. No. 19/214,499 filed May 21, 2025, and/or U.S. application Ser. No. 17/339,786 filed Jun. 4, 2021, each of which is incorporated herein in its entirety, but any other method can be used. In a sixth variant, the depth proxy prior is predicted from the image (e.g., using a SIDE model).

The inputs can be: sampled by an image sensor set with known calibration parameters (e.g., a known focal length, etc.), synthetically generated (e.g., using a rendering engine, game engine, etc.), scraped from a pre-existing database, and/or otherwise determined. In an example, the image can be an image from a stereo pair, an image sampled by a monocular camera, and/or be otherwise determined.

The inputs to the standard disparity model can be associated with: a known set of calibration parameters (e.g., known focal length in pixels, known focal length in meters, etc.), a principal point location, a set of preprocessing processes (e.g., transforms to center the principal point in the image frame, etc.), and/or any other information.

The standard disparity model 100 is preferably a neural network, but can additionally or alternatively leverage classical approaches (e.g., linear regression, stochastic methods, decision trees, equations, etc.) and/or any other architecture. The standard disparity model is preferably a vision-based neural network, but can alternatively be a multi-modal neural network (e.g., trained on appearance, geometry, language, etc.), and/or be trained on any other suitable modality. Examples of neural network architectures that can be used can include deep neural networks (DNNs), convolutional neural networks (CNNs), transformers, CAN, LSTM, RNN, an autoencoder, encoders, decoders, deep learning models, a non-ML based model, an image-to-image translation network (e.g., Pix2Pix), image inpainting networks, image-to-image regression network, ensemble methods (e.g., ensemble of models), and/or any other suitable architecture. In a specific example, the standard disparity model is a modified SIDE model.

In a first variant, the standard disparity model can include only a neural network (e.g., consist essentially of a neural network).

In a second variant, the standard disparity model can include a neural network with post-processing. For example, the standard disparity model can include a neural network that predicts a standard disparity map, and include a post-processor that corrects the standard disparity map to depth (e.g., using the focal length of the camera that sampled the input image) and/or reverses any image preprocessing on the standard disparity map and/or depth map.

In a third variant, the neural network can include a combination of multiple neural networks (e.g., one for disparity, one for semantic segmentation, etc.).

The standard disparity model (and/or other models discussed herein) can include (e.g., be constructed using): a set of input layers, hidden layers, and output layers (e.g., connected in series, such as in a feed forward network; connected with a feedback loop between the output and the input, such as in a recurrent neural network; etc.; wherein the layer weights can be learned through training); a set of fully or partially connected convolution layers (e.g., in a CNN); attention mechanisms (e.g., sequence-to-sequence architecture; a set of attention layers and/or self-attention layers; etc.); ensemble models; function approximators; and/or have any other suitable architecture.

The standard disparity model (and/or other models discussed herein) can use or extract data embeddings or features (e.g., neural network feature values, neural network feature vectors, computer vision features, etc.) from the input data, and determine the output based on the extracted features. In examples, the model can extract a set of machine learning features (e.g., an embedding) from the inputs (e.g., image, standard disparity prior, etc.), and determine the standard disparity for all or a subset of the image pixels based on the machine learning features. The features (e.g., encoding, embeddings) can be non-human readable or non-human comprehendible, or be human comprehendible. The features (e.g., encoding, embeddings) are preferably in a learned latent space (e.g., human-unintelligible, not humancrafted, etc.), but can alternatively be in a handcrafted space and/or in any other space. However, the models can otherwise determine the output based on the input data. However, the standard disparity model can be another type of model.

The system preferably includes a single standard disparity model 100 (e.g., for all camera types, all camera calibration parameters, all focal lengths, pixel sizes, etc.), but can alternatively include multiple standard disparity models and/or any other number of standard disparity models.

When the system includes multiple standard disparity models, different standard disparity models can be used for: different environmental contexts, different image segment classifications (e.g., sky, glass, a reflective surface, etc.), desired outputs (e.g., standard disparity, standard disparity and confidence, standard disparity and segmentations, etc.), different inputs (e.g., image only, image with standard disparity priors, etc.), different depth ranges (e.g., a first model with high accuracy in a first depth range, a second model with high accuracy in a second depth range, etc.), to generate multiple candidate standard disparities (e.g., wherein multiple standard disparity output representations are produced by the multiple models and used as inputs to an voting algorithm, mean standard disparity determination algorithm, and/or another suitable standard disparity combination algorithm); and/or otherwise differentiated.

However, the standard disparity model 100 may be otherwise configured.

The depth determination module 200 functions to convert the standard disparity to depth. The depth determination module 200 preferably converts standard disparity to depth for each pixel of the image, but can alternatively convert standard disparity to depth for regions of the image and/or any other set of pixels of the image. The depth determination module 200 is preferably a deterministic module, but can alternatively be a neural network (e.g., trained to predict depth based on the standard disparity), set of rules, and/or any other module.

In a first variant, the depth determination module 200 converts the standard disparity to depth by scaling an inverse standard disparity with the focal length (e.g., in pixels) associated with the image.

In a second variant, the depth determination module 200 converts the standard disparity to depth using: $Z=f/d$, where $Z$ is depth, $d$ is standard disparity, and $f$ is the focal length associated with the image.

In a third variant, the depth determination module 200 converts the standard disparity to depth using stereo methods (e.g., using a baseline of 1 m).

In a fourth variant, the depth determination module 200 can predict depth given the standard disparity representation (e.g., using a neural network trained to predict a set of training depth targets from a set of training standard disparity inputs).

The depth determination module 200 can additionally or alternatively reverse any image preprocessing steps on the output. The reversed image preprocessing steps can be applied to the standard disparity map, the depth map, and/or any other applicable target. In examples, the reversed image preprocessing steps can include applying an inverse transform, denormalization, reprojection, unwarping, uncropping, and/or any other reversed image preprocessing steps.

However, the depth determination module 200 may be otherwise configured.

In variants, the system (e.g., standard disparity model 100, depth determination module 200, etc.) can be used with a physical system 10.

The physical system 10 functions to operate in a physical space (e.g., physical environment, ambient environment). The physical system 10 can be used to generate training data, used to generate inference inputs, use the system outputs (e.g., depth map, etc.), and/or otherwise used. In variants, the models (e.g., standard disparity model, depth determination module, etc.) and/or the method can be executed: locally (e.g., on the physical system), remotely (e.g., on a remote computing device remote from the physical system), and/or be otherwise located relative to the physical system.

In variants, the physical system 10 includes a base system 20, a sensor set (e.g., the set of sensors 300, other sensors, etc.), and/or other components.

The base system 20 functions to physically locate the sensor set within the physical space. The base system 20 can mount, support, and/or otherwise retain the sensor set, the processing system (e.g., running the standard disparity model, the depth determination module, etc.), and/or other components. The sensor set can be static or mobile (e.g., actuatable) relative to the base system. The base system 20 can be static relative to the physical space, traverse through the physical space, and/or otherwise behave relative to the physical space. Examples of the base system 20 can include: a vehicle (e.g., autonomous vehicle, terrestrial vehicle, aerial vehicle, aquatic vehicle, etc.), a surgical robot, a robotic system, surveying equipment, a camera system, and/or any other system. The base system 20 can use the system outputs (e.g., depth map, etc.) for perception (e.g., object identification, scene understanding, etc.), planning, navigation, control, mapping, and/or otherwise use the system outputs.

The sensor set can include one or more sensors that function to sample data about the environment surrounding the physical system 10 and/or about the physical system 10 itself. The sensor set can include one or more image sensors, depth sensors, kinematic sensors, and/or other sensors. The sensor set is preferably calibrated (e.g., with known focal lengths, intrinsics, extrinsics, etc.), but can alternatively be uncalibrated. In an example, the sensor set can include a heterogeneous set of image sensors with different focal lengths (e.g., a narrow field of view camera and a wide field of view camera, etc.). In this example, the same standard disparity model can be used to determine depth maps from images sampled by both sensors (e.g., by predicting standard disparity maps from each image, and converting the standard disparity maps to depth maps using the respective focal lengths, etc.).

However, the base system 20 may be otherwise configured.

However, the physical system 10 may be otherwise configured.

The system can be used with a set of sensors 300, which function to sample data for depth prediction. The set of sensors 300 can be used to sample training data (e.g., to train the standard disparity model), sample inference data (e.g., to gather inputs for the standard disparity model, etc.), and/or otherwise used.

The set of sensors 300 preferably includes passive sensors (e.g., relies on ambient signals or light), but can alternatively include active sensors (e.g., measures a reflection of an emitted signal). In an example, the set of sensors 300 only includes passive sensors.

Each sensor of the set of sensors 300 is preferably calibrated and associated with a set of intrinsic parameters (e.g., focal length in pixels, principal point information, image distortion coefficients, etc.), and can additionally or alternatively be associated with a set of extrinsic parameters, and/or any other set of parameters.

The set of sensors 300 are preferably physical sensors (e.g., mounted to a training data collection rig, mounted to the physical system 10, etc.), but can additionally or alternatively include a set of virtual sensors (e.g., used to synthetic data from a virtual scene), and/or any other sensor.

The set of sensors can sample the set of data (e.g., from the real world, from a synthetic scene, etc.), synthesize the set of data, and/or otherwise generate the set of data.

The set of sensors 300 can include one or more: image sensors, depth sensors, kinematic sensors (e.g., IMU, gyroscope, etc.), and/or any other sensors.

The image sensors (e.g., video camera, monocular camera, stereocamera) can capture a 2D representation of the scene. The image sensors are preferably monocular cameras (e.g., rolling shutter cameras, global shutter cameras, etc.), but can alternatively be stereocameras, multiview cameras, and/or any other set of cameras. The image sensors can have a pinhole, wide angle, fisheye, telephoto, and/or any other type of lens. The image sensors can be calibrated and have known camera parameters or be uncalibrated. In an example, the focal lengths of the image sensors are known. The focal lengths of the image sensors are preferably in pixels, but can alternatively be in meters (e.g., with known or unknown pixel size or pixel pitch).

Different image sensors in the sensor set (e.g., different image sensors used to capture the inference images and/or training images) can have different calibration parameters (e.g., different focal lengths), but can alternatively have the same calibration (e.g., the same intrinsics, the same extrinsics, etc.). The image sensors can capture images in black and white, RGB, IR, UV, alternative other wavelength or spectral range.

However, any other image sensor can be used.

The depth sensor 300 can capture a 3D representation of the scene (e.g., depth). The sampled depth can be used generate a 3D depth map, surface normals, point cloud, mesh, and/or any other scene representation. The sampled depth can be used to generate a training target, used as a depth proxy (e.g., standard disparity model input), and/or otherwise used. Examples of depth sensors that can be used can include LiDAR, time-of-flight, structured light, radar, ultrasonic sensor, and/or any other depth sensors.

However, any other depth sensor can be used.

However, the set of sensors can include any other sensor type.

The data sampled by the sensors can include: images, optionally auxiliary data (e.g., depth data), and/or any other data.

The images are preferably monocular images, but can alternatively be multiview images (e.g., stereoimage, etc.) and/or other images. In a first example, the image input into the standard disparity model is a monocular image (e.g., a single monocular image). In a second example, the image into the standard disparity model can be part of a stereopair, wherein the stereopair can also be used to determine depth proxies and/or otherwise used. The images are preferably appearance-based images (e.g., captures light intensity, visual texture, color, etc.), but can alternatively be geometry-based images (e.g., depth image), and/or any other images.

The images used during inference are preferably not paired with a sampled inference depth map, but can alternatively be paired with a sparse depth map (e.g., with depth values for less than a threshold number of pixels), a sampled depth map, and/or any other geometric measurement.

The auxiliary data can include depth data and/or other auxiliary data. The auxiliary data is preferably aligned with the images, but can alternatively be misaligned. The auxiliary data preferably encompass the same scene region as the images, but can alternatively encompass a different scene region. The auxiliary data is preferably dense, but can alternatively be sparse. The auxiliary data can include point clouds, meshes, and/or any be otherwise represented. In a first variant, the auxiliary data is only sampled to generate training data. In a second variant, the auxiliary data is sampled during inference and used as a depth proxy prior (e.g., to condition the model). In a third variant, the auxiliary data is sampled during inference and used as a redundant measurement to the system outputs. The auxiliary data can alternatively be inferred, predicted, or otherwise determined (e.g., using a neural network, etc.).

The images and other data are preferably independently sampled from each other (e.g., sampled by distinct sensor sets, sampled by overlapping sensor sets, etc.), but can alternatively be derived from the same piece of data from the set (e.g., the depth data can be predicted from the images), and/or otherwise determined.

The set of data can include one or more measurements. When the set of data includes multiple measurements, the different measurements can depict overlapping regions of the scene, collocated regions of the scene, distinct regions of the scene, and/or be otherwise related.

The set of data can be preprocessed (e.g., after sampling), or can be used raw. In an example, the images can be dewarped, scaled, cropped, rotated, translated, transformed, registered, normalized, denoised, filtered, and/or otherwise processed.

However, the set of sensors 300 may be otherwise configured.

The training data generation module functions to produce training data using input images, camera intrinsics (e.g., focal length), a set of target standard disparity representations, and/or other training data.

In a first variant, the training data generation module can include a set of physical sensors configured to sample a physical scene (e.g., image sensor paired with a depth sensor).

In a second variant, the training data generation module can include a set of virtual sensors configured to sample a virtual scene (e.g., virtual image sensor paired with a 3D scene within the image sensor's frustrum).

In a third variant, the training data generation module can include a database of image-depth pairs.

However, the training data generation module may be otherwise configured.

4. Method

As shown in FIG. 1, variants of the method can include: optionally determining a standard disparity model S100; determining a set of input images S200; optionally determining a set of depth proxy priors S300; determining a standard disparity representation for an input image S400; and converting standard disparity to depth S500. The method functions to determine depth data based on an image. In a specific example, the method can determine standard disparity and/or depth maps for a set of input images, wherein different input images within the set were captured by cameras with different calibration parameters (e.g., different focal lengths), using the same standard disparity model.

The method is preferably performed using the system described above, but can additionally or alternatively be performed using any other system. In an example, the method can be performed using a standard disparity model (e.g., neural network) trained to predict a standard disparity output map (e.g., in pixels) based on a set of input images and optionally a corresponding set of depth proxy priors (e.g., depth values, standard disparity priors).

All or parts of the method can be performed continuously, iteratively, upon event occurrence (e.g., upon request receipt, upon receipt of an input image, etc.), and/or at any other suitable time. All or portions of the method can be performed in real time, contemporaneously, asynchronously, in parallel, serially, and/or with any other suitable relationship. All or portions of the method can be performed automatically, manually, semi-automatically, and/or otherwise performed.

The method can be performed by a processing system that is local or remote to the image sampling system (e.g., a camera), and/or by any other hardware.

The method preferably uses standard disparity, but can additionally or alternatively use any other suitable normalized parameter related to depth. In an example, the normalized parameter related to depth can include any affine invariant metric of focal length in relation to depth (e.g., inverse depth or 1/Z, focal-normalized depth or Z/f, or its inverse, log-depth, gradient of depth map $\partial Z$, etc.). In some variants, the standard disparity representation can additionally include a standard disparity gradient. In examples, for an image domain coordinate (u,v), the standard disparity gradient can be defined as the partial derivatives of standard disparity with respect to the image axis; as $\nabla d(u,v)$; computationally calculated as finite differences; computed from vanishing lines; and/or otherwise determined.

However, the method can operate in any other suitable basis or space.

Figure 4:
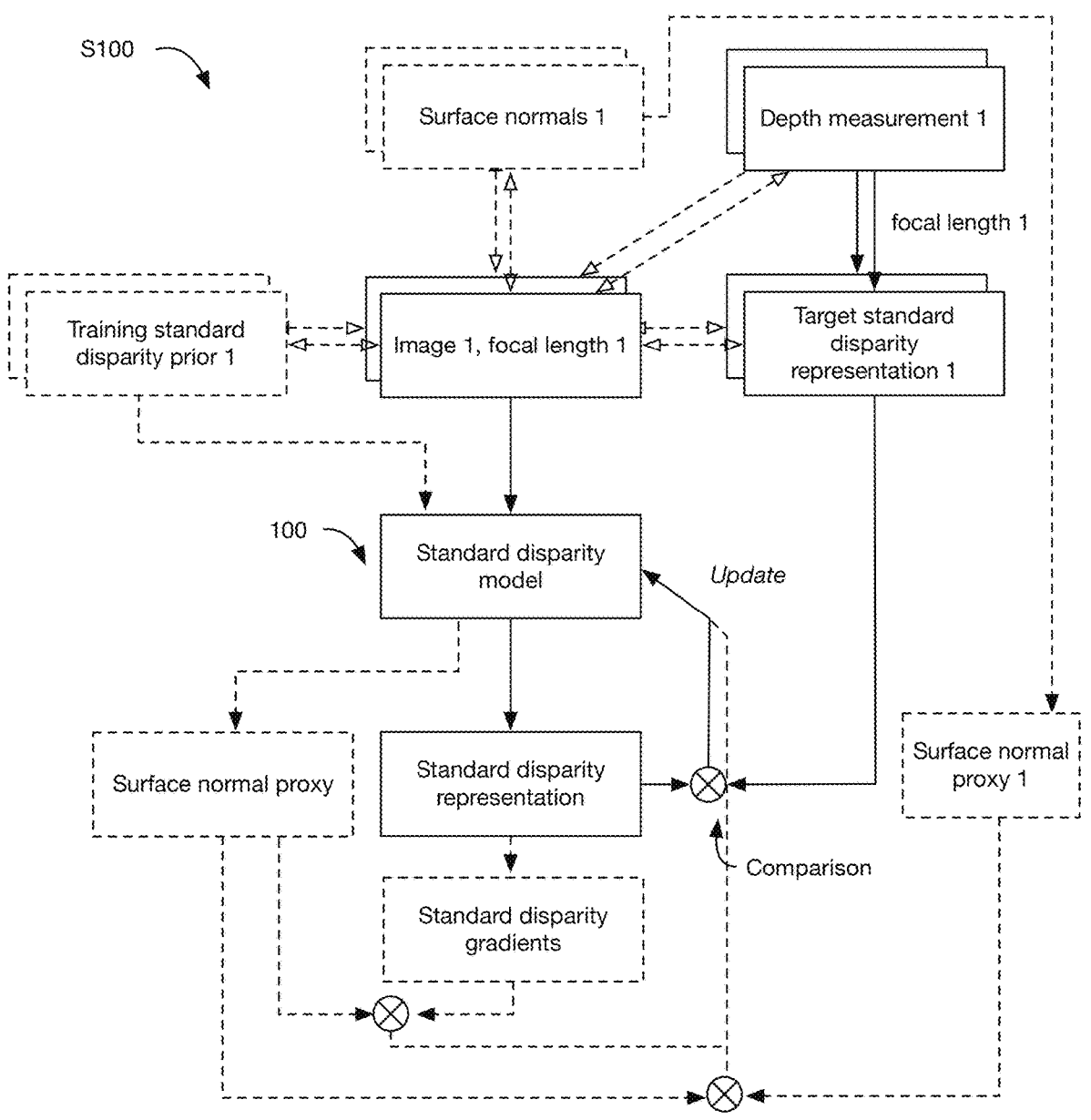
FIG. 4 is a schematic representation of a variant of determining a standard disparity model.

The method can optionally include determining a standard disparity model S100, which functions to obtain a standard disparity model that can determine (e.g., infer, predict, etc.) standard disparity (e.g., normalized inverse depth, normalized depth proxy, depth proxy, idealized disparity, focal-normalized inverse depth, focal-scaled inverse depth, focal length over depth, etc.) from an input image. An example of S100 is shown in FIG. 4.

The standard disparity model is preferably learned, but can additionally or alternatively be retrieved, received from a user, and/or otherwise determined. The standard disparity model can determine standard disparity for all or a subset of pixels (e.g., as an output) given an input image and optionally standard disparity priors as inputs. The standard disparity model can be trained using supervised learning, self-supervised, unsupervised learning, semi-supervised learning, reinforcement learning, transfer learning, Bayesian optimization, fitting, interpolation and/or approximation, backpropagation, and/or any other training processes.

In variants, determining a standard disparity model S100 includes determining a set of training data; and training the standard disparity model using the set of training data.

Determining training data functions to obtain training data for standard disparity model training. All or a portion of the training data set (e.g., training data pairs, training inputs, training targets, etc.) can be: measured (e.g., from real-world scenes), synthetically generated (e.g., simulated), and/or otherwise determined. The training data set can include a set of training inputs each paired with a set of training targets, and/or any other data. In an example, the training data preferably includes a training image paired with a set of training standard disparity data (e.g., ground-truth standard disparity data), but can additionally or alternatively include a set of auxiliary data, and/or any other data. The paired training data is preferably for the same scene (e.g., scene region), but can alternatively be otherwise defined. The set of training data is preferably sampled by a heterogeneous set of image sensors (e.g., with different camera types, different calibration parameters, different focal lengths, different pixel sizes, etc.) and/or depth sensors, but can alternatively include training data sampled by a single type of sensor (e.g., single calibration parameter set, focal length, pixel size, etc.) and/or any other data. When a new image sensor is available, the standard model can be fine-tuned, retrained, or otherwise updated using a calibration set captured using the new image sensor. Alternatively, the standard disparity model can be used to process images sampled by the new image sensor without any specialized retraining. The set of training data is preferably generated from a plurality of scenes (e.g., different scene configurations, lighting conditions, object compositions, motion profiles, feature density, etc.), but can additionally or alternatively be generated for a single scene.

The set of training inputs can include: a set of training images, an optional set of training depth proxy priors, and/or any other training inputs. The set of training images are preferably monocular images, but can alternatively be multiview images. The set of training images is preferably 2D, but can additionally or alternatively be 2.5D, 3D, and/or have any other suitable set of dimensions. The training images can be sampled in RGB, IR, UV, NIR, grayscale, and/or any other suitable spectral range, be radar images, and/or be otherwise configured. Each training image is preferably associated with a known calibration parameter set for the image sensor that sampled the image (e.g., known intrinsics, known extrinsics, etc.), but can additionally or alternatively be associated with a principal point, preprocessing steps, and/or any other set of image data.

The calibration parameter set can include a training focal length, training pixel size, and/or other camera parameters. The training focal length can be the focal length of the camera used for image capture, the effective focal length (e.g., the effective focal length after image cropping, scaling, and/or another image modification), and/or any other suitable focal length. The focal length is preferably in pixel units, but can additionally or alternatively be in other units. The training camera parameter set can be determined from the camera intrinsics (e.g., the intrinsic calibration, the intrinsic matrix, etc.), calculated, manually specified, and/or otherwise determined. In examples, each training image can be associated with the focal length (e.g., in pixels, in meters, etc.) of the image sensor that sampled the image.

The training image set preferably includes training images sampled using a plurality of different training camera parameters (focal lengths, pixel sizes, etc.), but can additionally or alternatively be sampled using the same set of camera parameters. In a specific example, the training image set can include training images captured using a macro lens and training images captured using a telephoto lens. Training images can be captured by the same camera or different cameras (e.g., wherein the different cameras have different focal length, pixel size, and/or other parameters). Training images can depict real scenes (e.g., be images sampled from real scenes), can be synthetic images, and/or be otherwise generated. However, the training image can be otherwise configured.

The training images can be sampled (e.g., using an image sensor), synthesized (e.g., using a virtual image sensor, using a rendering engine, etc.), retrieved from an image database, and/or otherwise obtained. The training images can be preprocessed (e.g., to change the principal point location, warp, etc.) or be a raw image.

The optional set of training depth proxy priors function to provide the standard disparity model with a prior standard disparity value for a given pixel of an associated image. The training depth proxy priors are preferably sparse, but can alternatively be dense. The training depth proxy priors can include: depth values, standard disparity values, and/or other values, the training depth proxy priors are preferably associated with a training image of the set of training images, but can alternatively be unassociated with the training images. In an example, the training depth proxy priors can include standard disparity values for all or a portion of pixels within the respective image. The training depth proxy priors can be subsampled from the training standard disparity data, subsampled from the training depth data, predicted from the image, and/or otherwise determined.

All or portions of the training input can be associated with: a set of calibration parameters for the sensor sampling the training data (e.g., known focal length in pixels, known focal length in meters, etc.), a known principal point location in the image frame, a set of preprocessing corrections used to locate the principal point in a predetermined frame location (e.g., used to center the principal point in the image frame), and/or any other information.

The set of training targets function as a ground-truth reference for determining the training loss. The set of training targets can include: a set of training standard disparity data; an optional set of auxiliary data; and/or other training targets.

The set of training standard disparity data is preferably determined from training depth data paired with the image, but can additionally and/or alternatively be otherwise determined.

The set of training depth data (e.g., ground-truth depth data) preferably includes a depth map, more preferably a dense depth map (e.g., with a depth value for more than a threshold proportion of the image or measured scene), but can additionally or alternatively be a sparse depth map and/or any other depth map. The training depth data is preferably aligned with the paired image, but can alternatively be otherwise registered or related to the image. The training depth data is preferably generated alongside the set of training images, but can alternatively be otherwise generated. The training depth data is preferably generated (e.g., sampled, synthesized, etc.) independently from the image, but can alternatively be generated using the image and additional information (e.g., a second image, etc.), be generated from the image (e.g., predicted from the image), and/or otherwise generated.

In a first variant, the training depth data can be sampled using a depth sensor calibrated to the image sensor (e.g., lidar, radar, ultrasound, a stereo camera, structured light, time of flight, etc.). In a second variant, the training depth data can be synthesized from the same virtual scene as the synthetic image. In a third variant, the training depth data can be estimated from the image and a secondary image (e.g., using stereoscopic methods, structure from motion, visual odometry, etc.). In a fourth variant, the training depth data can be estimated from the training image (e.g., using a modified SIDE model, determined from a stereo image pair; etc.). In variants, each training depth point can correspond to one or more pixels in the training image.

However, the training depth data can be otherwise determined.

The training standard disparity data (determined from the training depth data) is preferably a standard disparity map, but can alternatively include any other standard disparity representation. The training standard disparity data is preferably a dense map, but can alternatively be a sparse map. The training standard disparity data preferably includes a standard disparity target value for all or a subset of pixels in the training image, but can additionally or alternatively include a single standard disparity value, a vector of standard disparity values, and/or otherwise represent the standard disparity paired with the training image.

The training standard disparity data is preferably determined using the training depth data and the focal length of the imaging sensor that sampled the image, but can be otherwise determined.

In a first variant, the training standard disparity data is determined by scaling an inverse depth (e.g., at each pixel) by the focal length (e.g., in pixels) for the paired image.

In a second variant, the training standard disparity data is determined using: $d=f/Z$, where f is the focal length for the paired image and Z is the depth at each pixel.

In an example, the training target can be a standard disparity target representation associated with a training image, wherein the training image is sampled using a set of training camera parameters (e.g., focal length in pixels, pixel size, etc.). The standard disparity target representation can include a standard disparity training map that includes a standard disparity target value for all or a subset of pixels in the training image, a single standard disparity value, a vector of standard disparity values, and/or any other suitable standard disparity representation. The standard disparity target value can be determined by dividing the training focal length (in pixels) by the depth for the respective pixel and multiplying by a standard baseline (in distance units, such as 1 meter), or be otherwise determined.

However, the training standard disparity data can be otherwise determined.

The optional set of auxiliary data function to provide a secondary training target when training the standard disparity model, which can improve the accuracy of the model and/or the speed of training. The set of auxiliary data can include surface normals, vanishing lines, surface normal gradients (e.g., determined by calculating the gradient of the target standard disparity across the image), etc. The auxiliary data is preferably aligned with the paired image and/or set of training depth data, but can alternatively be otherwise registered.

The auxiliary data is preferably generated alongside the set of images (e.g., sampled, synthesized, etc.), but can alternatively be otherwise generated. The auxiliary data is preferably independently generated from the image, but can alternatively be generated using additional information (e.g., a second image, etc.), be generated from the image (e.g., predicted from the image), and/or otherwise generated. The auxiliary data can be generated from the set of training depth data, independently generated from the training depth data, and/or otherwise generated.

In a first example, the surface normals are independently sampled from the image. In a second example, the vanishing lines and/or surface gradients can be generated from independently-sampled surface normals. In a third example, the surface normals can be computed from the training depth data. In a fourth example, the surface normals can be determined from the standard disparity.

However, the set of training targets can include and/or any other training targets.

However, determining training data may be otherwise performed.

Training the standard disparity model using the set of training data functions to generate a generalized standard disparity model.

In variants, determining a standard disparity model S100 can include iteratively: feeding the training inputs (e.g., training image, optionally a training standard disparity prior, etc.) into the standard disparity model; determining (e.g., predicting, inferring, etc.) a standard disparity representation (e.g., a standard disparity map; a standard disparity value per pixel of the image, etc.) based on the training inputs; and updating the standard disparity model based on a comparison between the predicted output and the training targets (e.g., updating the model based on a loss computed between the predicted output and the training target; backpropagating loss to update model weights and biases; etc.). However, the standard disparity model can be otherwise trained.

The loss function used for training is preferably not scale-invariant, but can additionally or alternatively be scale-invariant.

In variants, the loss function can be based on the standard disparity model predicting the output and being updated based on: a comparison between the predicted and target output values; a consistency check between the standard disparity data and the target auxiliary data; other losses (e.g., L1, L2, cross-entropy, KL divergence, edge-aware smoothness, gradient-matching on standard disparity, structure-aware penalties on planar regions, uncertainty-weighted residuals, etc.), and/or any other loss function.

The comparison between the predicted and target outputs (e.g., data loss) can be for: standard disparity values, auxiliary data (e.g., surface normals, gradients, etc.), and/or any other data.

In a first example, the standard disparity model can predict the standard disparity data (e.g., standard disparity map) and be updated based on a comparison between the predicted and target standard disparity data.

In a second example, the standard disparity model can predict a set of surface normals and be updated based on a comparison between the predicted and target set of surface normals.

In a third example, the standard disparity model can predict a set of vanishing lines and be updated based on a comparison between the predicted and target set of vanishing lines.

In a fourth example, the standard disparity model can predict a set of surface normal gradients and be updated based on a comparison between the predicted and target set of surface normal gradients.

In a fifth example, the standard disparity model can predict a set of vanishing lines and an independent set of standard disparity values, and be updated based on a comparison between a gradient of the predicted standard disparity values and a surface normal proxy determined from the predicted set of vanishing lines. In this example, the surface normal proxy can include the vanishing line scaled by a transpose of a camera calibration matrix associated with the training image, or be any other surface normal proxy.

In a sixth example, the standard disparity model can predict the standard disparity data (e.g., standard disparity map), wherein the standard disparity data is converted into depth data (e.g., by scaling the inverse standard disparity by the focal length), and wherein the standard disparity model is updated based on a comparison between the determined depth data and the training depth data. In a specific example of the fifth example, the standard disparity model can be determined by determining standard disparity (e.g., a map or a value), converting standard disparity into depth by dividing the training focal length (e.g., in pixels) by the determined standard disparity and multiplying by a standard baseline (e.g., in distance units, such as 1 meter), comparing the depth against a target depth, and updating the model based on the comparison.

The consistency check can verify that the predicted auxiliary data is physically consistent with the predicted (e.g., independently predicted) depth proxy (e.g., standard disparity). The consistency check can be computed in the image space, standard disparity space, Euclidean space, and/or any other space. In examples, the consistency check can be performed when avoiding the Euclidean space entirely.

In a first variant of updating the standard disparity model using a consistency check, the standard disparity model can be updated based on a comparison between the gradient of the predicted standard disparity map (e.g., at the current pixel, using finite differences) and partial derivatives derived from the target set of vanishing lines and the standard disparity value (e.g., at the current pixel). In an example, the loss can be determined using $$\nabla d_i = (a/e, b/e) = \left( \frac{d_i l_1}{\vec{l} \cdot \vec{n}}, \frac{d_i l_2}{\vec{l} \cdot \vec{n}} \right),$$

where ($l = [l_1, l_2, l_3]^T$) are vanishing lines and (n=[a, b, c]$^T$) are surface normal, and where a Euclidean plane through the 3D surface can be written as aX+bY+cZ=e, where a Euclidean world frame has axes (X, Y, Z). For pixels that lie on a single physical plane, standard disparity and vanishing line satisfy e=f$l$ ·u/d(u,v), which generates another independent standard disparity gradient measurement as $$\nabla d(u, v) \equiv \left( \frac{d \times l_1}{l \cdot u}, \frac{d \times l_2}{l \cdot u} \right).$$

In this example, $d_i$ is the standard disparity at the pixel; $d_i$ expresses a discrete representation of d(u,v); and a and b are tied to surface normal, where the gradient term is expressed as the tilt of the plane (given by aX+bY+cZ=e) expressed as a disparity gradient.

In a second variant, the standard disparity model can be updated based on a comparison between the gradient of the predicted standard disparity map (e.g., at the current pixel, using finite differences) and partial derivatives derived from the predicted set of vanishing lines and the standard disparity value (e.g., at the current pixel) (e.g., using the relationship defined in the first variant).

In a third variant, the standard disparity model can be updated based on a comparison between depth linearity where the surface normal is constant.

In a fourth variant, the standard disparity model can backproject 3D points from the depth map, fit a plane, and compare the computed surface normal to their network's direct prediction of surface normal.

However, determining a standard disparity model S100 may be otherwise performed.

Figure 2:
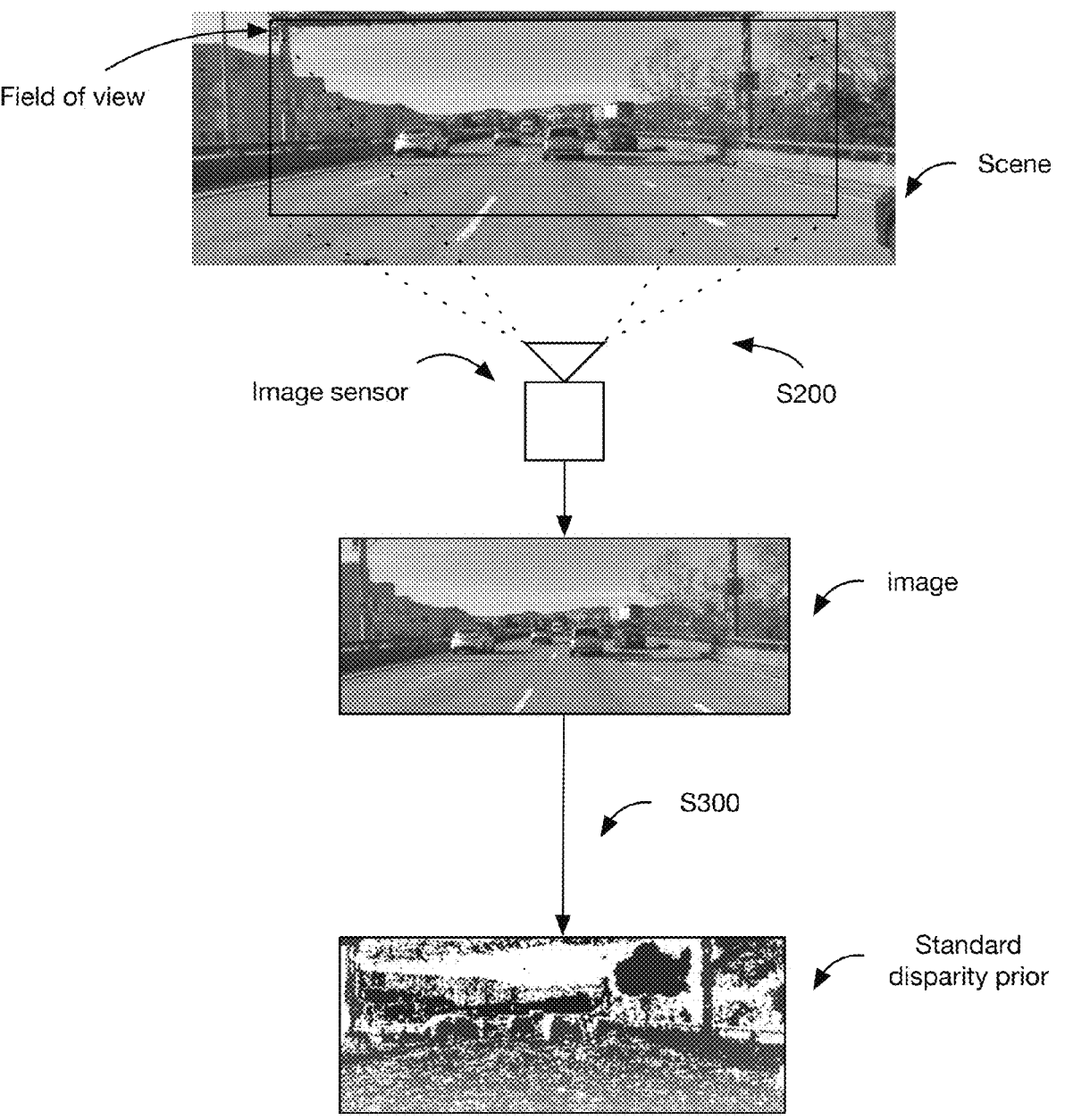
FIG. 2 is an illustrative example of a variant of determining a standard disparity prior associated with the input image.

Determining a set of input images S200 functions to determine an input for the standard disparity model. An example of S200 is shown in FIG. 2. The set of input images can be sampled by one or more cameras (e.g., a heterogeneous set of cameras) using different camera parameters (e.g., heterogenous camera parameters, different focal lengths, different pixel sizes, etc.) or the same camera parameters (e.g., the same camera intrinsics). In an example, the set of input images can be sampled by the sensor set on the base system and/or by any other image sensor set. The input images can be 2D images or have any other suitable dimensionality. The input images can be RGB images, UV images, IR images, and/or any other suitable type of image.

The input images can be: received from the image sensor (e.g., in real or near-real time, after a delay, etc.), received from a data set, include a set of frames taken from a video, and/or otherwise determined. The input images optionally be pre-selected based on blur, saturation, exposure anomalies, compression artifacts, and/or any other suitable criteria, which reduces training and/or inference on corrupted frames and improves robustness of the standard disparity or depth outputs.

Each input image is preferably associated with a calibration parameter set ("camera parameter set"), but can additionally and/or alternatively be associated with other data. The calibration parameters can be: determined from a camera calibration (e.g., intrinsic calibration), manually specified, estimated, and/or otherwise determined. The camera parameter set can include focal length (e.g., in pixels), principal point location, pixel size, pixel aspect ratio, skew, lens distortion coefficients (e.g., radial or, tangential, etc.), and/or any other parameter.

In an example, camera parameters are received alongside the input image (e.g., in input image metadata).

One or more of the input images can optionally be associated with a set of preprocessing operations that were used to preprocess the image (e.g., to center the principal point, to standardize the image, enhance SNR, correct geometry, improve computational efficiency, etc.).

The preprocessing operations that can be used can include: resizing, cropping, normalizing pixel intensity, converting color space, denoising, histogram equalization, rectification/dewarping, aligning/registering, rotating/flipping, downsampling, quantizing, and/or any other preprocessing operation.

The image preprocessing preferably does not change the focal length (e.g., in pixels), but can additionally or alternatively change the focal length in pixels.

However, determining a set of input images S200 may be otherwise performed.

The method can optionally include determining a set of depth proxy priors S300, which functions to determine prior depth proxy information for each input image in a set of input images. The depth proxy priors can be sparse (e.g., include values for less than a threshold proportion of the image; example shown in FIG. 2) or dense (e.g., include values for all or more than a threshold proportion of the image). The depth proxy prior values can be treated as ground-truth values, can be treated as an initial estimate (e.g., wherein the prior values are overwritten in the determined standard disparity representation), used to condition the model (e.g., bias the model toward those values), used to validate the model outputs, or can be otherwise used by the model.

The depth proxy prior can include: a set of depth values (e.g., depth for a subset of the image pixels), a set of standard disparity values (e.g., focal-length scaled inverse depth for a subset of the image pixels), sparse depth hints, structure-from-motion tracks, key point-based parallax cues, planar-region hypotheses, ground-plane hypotheses, scene-class priors, object class priors, a set of geometric constraints (e.g., from segmentation), and/or any other depth proxy.

In a variant, a depth proxy prior can be a standard disparity map but can be otherwise represented.

The depth proxy priors are preferably associated with the input image (e.g., associated with one or more pixels of the input image), but can alternatively be otherwise associated with the input image. A depth proxy prior can be determined for all, a portion, or none of the set of input images. Zero, one, or multiple depth proxy priors can be determined for each input image. One or more of the depth proxy priors can optionally be associated with confidence or validity values (e.g., used by the standard disparity model to predict the output).

A depth proxy prior can be determined from independent depth measurements associated with the image (e.g., LIDAR, radar, or other depth measurements contemporaneously sampled with the image), be determined from a rectified stereopair (e.g., wherein the image is an image of the stereopair), be determined from multiple images captured in sequence by the same camera (e.g., where depth is calculated using a structure from motion method, using optical flow, etc.), be determined from a depth estimation model (e.g., a SIDE model), and/or can be otherwise determined.

In a first variant, a depth prior can be determined by estimating depth from the image and a second image (e.g., using stereo methods, SfM, optical flow, etc.).

In a second variant, a depth prior can be determined by directly measuring the depth of one or more physical points depicted in the image.

In a third variant, a depth prior can be predicted from the image (e.g., using a SIDE model).

In a fourth variant, a standard disparity prior can be determined by converting depth measurements (e.g., a point cloud, depth map, etc.; determined using the first, second, or third variants, etc.) into a standard disparity prior (e.g., by multiplying an inverse of each depth measurement by the focal length in pixels and a standard baseline in meters).

In a fifth variant, a standard disparity prior can be determined by converting disparity (e.g., from stereo methods) into standard disparity.

In a fifth variant, standard disparity values from one or more sources and/or methods can be aggregated into a single standard disparity prior. The standard disparity values can be aggregated using confidence-weighted fusion, robust statistics, or spatial regularizers (e.g., guided or bilateral filters), CRF, Laplacian smoothing, and/or any other aggregation methods.

However, a set of depth proxy priors can be otherwise determined.

Figure 3:
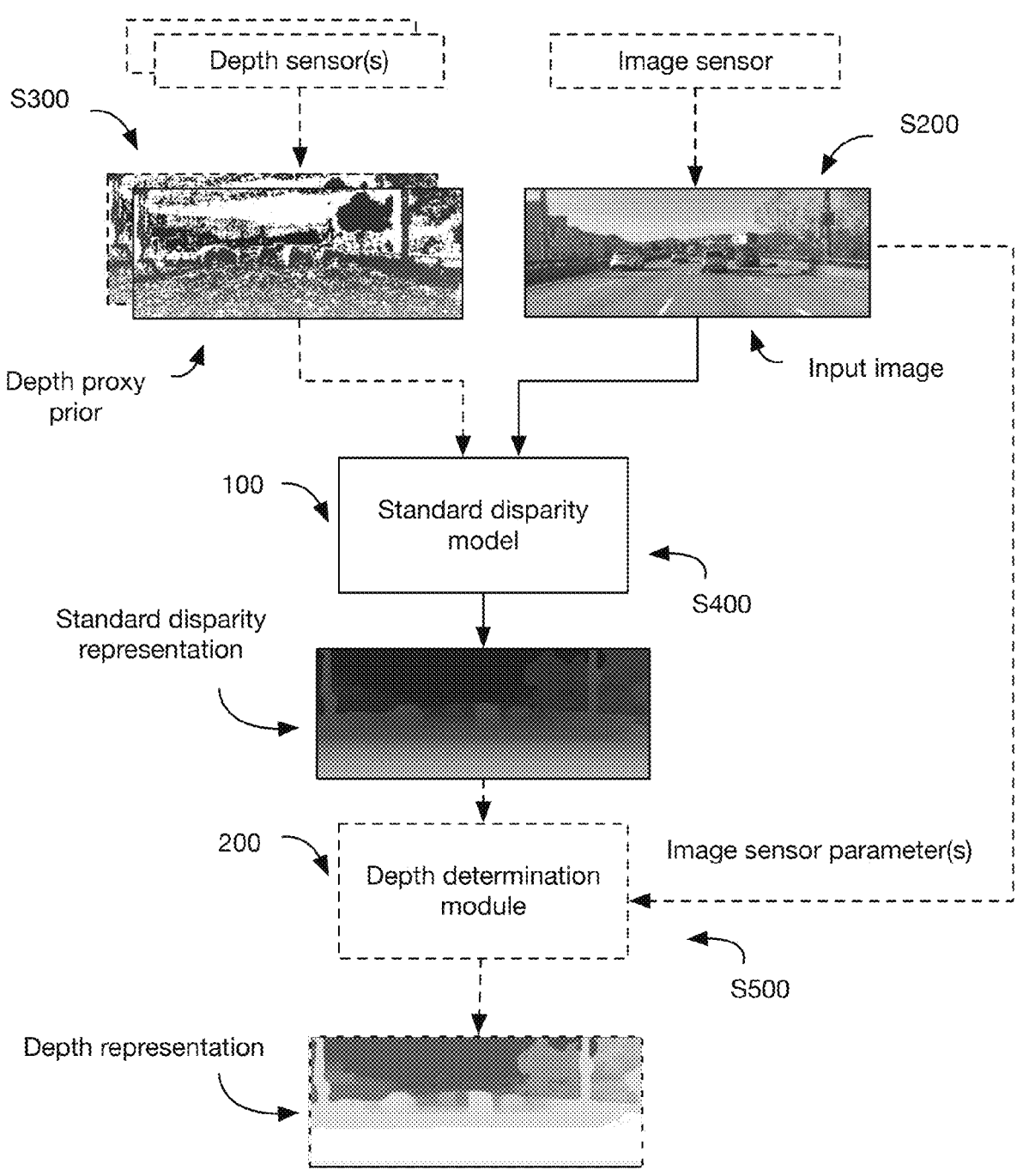
FIG. 3 is an illustrative example of a variant of determining a depth representation for the input image.

Determining a standard disparity representation for an input image S400 functions to determine a standard disparity value for one or more pixels of the input image. An example of S400 is shown in FIG. 3.

In variants, S400 can additionally or alternatively determine (e.g., predict): a set of confidence scores (e.g., for each standard disparity value, for the standard disparity representation, etc.), a set of surface normal proxies (e.g., a set of surface normals, a set of vanishing lines, a set of standard disparity gradients, etc.), and/or any other output.

S400 can be performed: for each input image in the input image set, a subset of the input images, and/or any other set of input images. S400 can be performed (e.g., repeated) one or more times for one or more input images. In an example, when S400 is repeated for the same image, the resultant standard disparity representation can be aggregated (e.g., averaged, combined using a weighted sum, sampled based on the respective standard disparity value's confidence score, etc.) and/or otherwise used.

S400 can be performed when the input image is sampled or generated (e.g., in real- or near-real time), when the input image is received, when a depth estimation request is received, asynchronously from image sampling, and/or at any other time.

S400 is preferably performed using the standard disparity model (e.g., discussed above; trained in S100, etc.), but can additionally or alternatively be performed using any other suitable model. The same standard disparity model is preferably used to determine standard disparity representations for all input images; alternatively, different standard disparity models can be used for different input images (e.g., different calibration parameter ranges, different camera types, different image types, etc.).

The standard disparity representation is preferably predicted, but can additionally or alternatively be inferred, computed, estimated, and/or otherwise determined. The standard disparity representation can be: a dense map (e.g., include a standard disparity value for each input image pixel or more than a threshold number of pixels within an input image); a sparse map (e.g., include a standard disparity value for less than a threshold number of input image pixels); a multi-resolution pyramid of standard disparity maps (e.g., from coarse-to-fine maps); be a single value; a set of values, and/or be otherwise configured. The standard disparity representation preferably includes standard disparity and does not include depth, but can alternatively be a depth representation (e.g., a depth map or a depth for multiple pixels of the image).

The standard disparity representation can be determined based on: an input image from the set of input images; the optional set of standard disparity priors associated with the respective input image; and/or any other model inputs. The standard disparity representation is preferably not determined based on the camera parameters (e.g., not based on the focal length of the sampling camera), but can alternatively ingest camera parameters.

In variants, S400 can be performed by inputting the input image into a standard disparity model, optionally alongside a set of depth proxy priors associated with the input image, wherein the standard disparity model predicts a standard disparity representation (e.g., standard disparity map) based on the inputs. This can be performed for each input image in the set of input images.

However, S400 can be otherwise performed.

Converting standard disparity to depth S500 functions to determine depth for each image in a set of input images.

S500 can be performed: for each input image in the input image set, a subset of the input images, any other set of input images, for each standard disparity representation, and/or otherwise performed for any other suitable scope. S500 can be performed (e.g., repeated) one or more times for one or more input images, one or more standard disparity representations, and/or for any other datum.

S500 can be performed when the input image is generated (e.g., in real- or near-real time), when the input image is received, when a depth estimation request is received, when a standard disparity representation is generated, and/or at any other time.

S500 can be performed by the depth determination module and/or any other module. The same depth determination module is preferably used to determine the depth representations for all input images and/or all standard disparity representations, but can alternatively be different depth determination modules used for different input images (e.g., different calibration parameter ranges, different camera types, different image types, etc.), different standard disparity representations, and/or any other different representations.

S500 preferably includes converting the standard disparity representation to a depth representation, but can additionally or alternatively include converting a single standard disparity value to a depth value, a subset of the standard disparity values to depth values, and/or converting any other set of standard disparity values to depth values. The depth representation can be a depth map, point cloud, mesh, and/or another suitable depth representation. The depth can be used by other methods and/or systems for navigation, path planning, scene understanding, segmentation, and/or other uses. The depth is preferably in absolute global scale, but can alternatively be in a relative scale, scaled by a unitless coefficient, unscaled, and/or in any other suitable scale.

The depth representation is preferably determined based on the focal length of the image sensor that sampled the input image (e.g., in pixels), but can additionally or alternatively be determined based on the focal length of the image sensor in metric scale, the confidence scores for the standard disparity values, the surface normal proxies predicted by the standard disparity model, and/or any other information.

In a first variant, the depth can be determined by scaling the inverse standard disparity with the focal length (e.g., in pixels) associated with the image. For example, depth can be determined by multiplying an inverse of the standard disparity value (d), the focal length (f) (e.g., in pixels) and optionally a standard baseline (b) (e.g., 1 meter).

In a second variant, the depth can be determined using: $Z=f/d$, where $Z$ is depth, $d$ is standard disparity, and $f$ is the focal length associated with the image. In an example, the depth can be determined using $Z(u,v)=f/d(u,v)$, where $Z(u,v)$ is the depth at each pixel $(u,v)$, $f$ is the focal length (e.g., in pixels), and $d(u,v)$ is the standard disparity at the pixel $(u,v)$.

In a third variant, con the depth can be determined from standard disparity and camera parameters by calculating depth from an auxiliary measure of standard disparity (e.g., from standard disparity gradients and/or from surface normal calculated from the standard disparity).

In a fourth variant, the depth can be determined using the standard disparity representation and optionally the depth proxy priors as input.

However, depth can be otherwise determined.

In variants, converting standard disparity to depth S500 optionally includes compensating for image preprocessing, which functions to reverse the effects of image preprocessing such that the resultant depth information is aligned with the raw image. Compensating for image preprocessing preferably includes reversing the preprocessing processes that were applied to the image, but can alternatively otherwise compensate for image preprocessing. The preprocessing processes that were applied to the image (e.g., to normalize the principal point, etc.) can be stored in the image metadata, associated with the image (e.g., in a database), and/or otherwise determined.

Examples of image preprocessing techniques that can be reversed can include: uncropping, remapping, denormalization, reprojection, unwarping, applying an inverse transform, and/or any other preprocessing compensation method.

The reversed preprocessing processes are preferably applied to the depth data (e.g., generated in S500), but can additionally or alternatively be applied to the standard disparity representation (e.g., generated in S400) and/or to any other data.

However, compensating for image preprocessing may be otherwise performed.

However, converting standard disparity to depth S500 may be otherwise performed.

5. SPECIFIC EXAMPLES

Specific example 1. A method comprising: receiving an image sampled by an image sensor with a known focal length; predicting a standard disparity map from the image using a standard disparity model; and determining a depth map corresponding to the image using the known focal length and the standard disparity map.

Specific example 2. The method of specific example 1, wherein the standard disparity map comprises a standard disparity at each of a set of pixels, wherein determining the depth map comprises determining a depth for each of the set of pixels by scaling an inverse standard disparity at each pixel of the standard disparity map with the known focal length.

Specific example 3, The method of specific example 1, wherein the standard disparity map comprises a standard disparity for more than a majority of pixels in the image.

Specific example 4. The method of specific example 1, wherein the known focal length is in pixels.

Specific example 5. The method of specific example 1, wherein the standard disparity model comprises a trained neural network, wherein training the standard disparity model comprises: determining a plurality of training images, each associated with a training focal length and an independently-sampled training depth map; and for each training image: determining a target standard disparity map based on the respective training focal length and the respective training depth map; predicting a predicted standard disparity map based on the training image using the standard disparity model; and updating the standard disparity model based on a comparison between the predicted standard disparity map and the target standard disparity map.

Specific example 6. The method of specific example 5, wherein the plurality of training images is sampled using a heterogeneous set of focal lengths.

Specific example 7. The method of specific example 5, wherein the training image is associated with an independently-sampled training surface normal map, wherein training the standard disparity model further comprises: extracting a set of target vanishing lines from the training surface normal map; independently predicting a set of predicted vanishing lines based on the training image using the standard disparity model; and updating the standard disparity model based on a comparison between the set of target vanishing lines and the set of predicted vanishing lines.

Specific example 8. The method of specific example 5, wherein training the standard disparity model further comprises: independently predicting a set of predicted vanishing lines based on the training image using the standard disparity model; and updating the standard disparity model based on a comparison between a gradient of the predicted standard disparity map and a surface normal proxy determined from the set of predicted vanishing lines.

Specific example 9. The method of specific example 1, wherein the image consists of a monocular image.

Specific example 10. The method of specific example 1, wherein the standard disparity model is used to predict a second standard disparity map for a second image associated with a second focal length different from the known focal length; wherein a second depth map corresponding to the second image is determined from the second standard disparity map and the second focal length.

Specific example 11. The method of specific example 1, wherein the image sensor is mounted to a vehicle, the method further comprising controlling the vehicle using the depth map.

Specific example 12. The method of specific example 1, wherein the standard disparity map is further predicted based on a set of sparse depth values associated with the image. Specific example 13. A system, comprising: a processing system; a non-transitory computer readable medium storing software instructions that, when executed by a processing system, cause the processing system to perform a method comprising: receiving an image captured by an image sensor with a focal length; predicting a normalized inverse depth map for the image using a trained normalized inverse depth model; and determining a dense depth map for the image based on the focal length and the normalized inverse depth map.

Specific example 14. The system of specific example 13, wherein the focal length is in pixels.

Specific example 15. The system of specific example 13, further comprising a vehicle comprising the image sensor, wherein the vehicle is controlled based on the normalized inverse depth map.

Specific example 16. The system of specific example 15, wherein the vehicle further comprises a second image sensor with a second focal length different from the focal length, wherein a second normalized inverse depth map is predicted from a second image sampled by the second image sensor using the normalized inverse depth model, and a second depth map is determined from the second normalized inverse depth map using the second focal length.

Specific example 17. The system of specific example 13, wherein the image consists essentially of a monocular image.

Specific example 18. The system of specific example 13, wherein the normalized inverse depth model comprises a trained neural network, wherein training the normalized inverse depth model comprises: determining a set of training images, wherein different training images in the set of training images are associated with different focal lengths and different depth maps; for each training image: determining a target normalized inverse depth map based on the respective focal length and the respective depth map; predicting a predicted normalized inverse depth map from the training image using the normalized inverse depth model; and updating parameters of the normalized inverse depth model based on a comparison between the predicted normalized inverse depth map and the target normalized inverse depth map.

Specific example 19. The system of specific example 18, wherein training the normalized inverse depth model further comprises, for each training image: predicting a surface normal proxy map from the training image using the normalized inverse depth model; determining a normalized inverse depth gradient map from the predicted normalized inverse depth map; and updating the normalized inverse depth model by enforcing a consistency constraint between the normalized inverse depth gradient map and the surface normal proxy map.

Specific example 20. The system of specific example 13, wherein the normalized inverse depth map is further predicted using a set of sparse depth proxy priors.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken line in the figures. However, unbroken lines in the figures should not be interpreted to indicate that the depicted elements are essential, nor to indicate that the depicted elements may not be omitted from variants of the invention.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method comprising:

receiving an image sampled by an image sensor with a known focal length;

predicting a standard disparity map from the image using a standard disparity model; and determining a depth map corresponding to the image using the known focal length and the standard disparity map;

wherein the standard disparity model comprises a trained neural network, wherein training the standard disparity model comprises:

determining a plurality of training images, each associated with a training focal length and an independently-sampled training depth map; and for each training image:

determining a target standard disparity map based on the respective training focal length and the respective training depth map;

predicting a predicted standard disparity map based on the training image using the standard disparity model; and updating the standard disparity model based on a comparison between the predicted standard disparity map and the target standard disparity map.

2. The method of claim 1, wherein the standard disparity map comprises a standard disparity at each of a set of pixels, wherein determining the depth map comprises determining a depth for each of the set of pixels by scaling an inverse standard disparity at each pixel of the standard disparity map with the known focal length.

3. The method of claim 1, wherein the standard disparity map comprises a standard disparity for more than a majority of pixels in the image.

4. The method of claim 1, wherein the known focal length is in pixels.

5. The method of claim 1, wherein the plurality of training images is sampled using a heterogeneous set of focal lengths.

6. The method of claim 1, wherein the training image is associated with an independently-sampled training surface normal map, wherein training the standard disparity model further comprises:

extracting a set of target vanishing lines from the training surface normal map;

independently predicting a set of predicted vanishing lines based on the training image using the standard disparity model; and updating the standard disparity model based on a comparison between the set of target vanishing lines and the set of predicted vanishing lines.

7. The method of claim 1, wherein training the standard disparity model further comprises:

independently predicting a set of predicted vanishing lines based on the training image using the standard disparity model; and updating the standard disparity model based on a comparison between a gradient of the predicted standard disparity map and a surface normal proxy determined from the set of predicted vanishing lines.

8. The method of claim 1, wherein the image consists of a monocular image.

9. The method of claim 1, wherein the standard disparity model is used to predict a second standard disparity map for a second image associated with a second focal length different from the known focal length; wherein a second depth map corresponding to the second image is determined from the second standard disparity map and the second focal length.

10. The method of claim 1, wherein the image sensor is mounted to a vehicle, the method further comprising controlling the vehicle using the depth map.

11. The method of claim 1, wherein the standard disparity map is further predicted based on a set of sparse depth values associated with the image.

12. A system, comprising:

a processing system;

a non-transitory computer readable medium storing software instructions that, when executed by a processing system, cause the processing system to perform a method comprising:

receiving an image captured by an image sensor with a first focal length;

predicting a normalized inverse depth map for the image using a trained normalized inverse depth model; and determining a dense depth map for the image based on the first focal length and the normalized inverse depth map;

wherein the normalized inverse depth model comprises a trained neural network, wherein training the normalized inverse depth model comprises:

determining a set of training images, wherein different training images in the set of training images are associated with different focal lengths and different depth maps;

for each training image:

determining a target normalized inverse depth map based on the respective focal length and the respective depth map;

predicting a predicted normalized inverse depth map from the training image using the normalized inverse depth model; and updating parameters of the normalized inverse depth model based on a comparison between the predicted normalized inverse depth map and the target normalized inverse depth map.

13. The system of claim 12, wherein the first focal length is in pixels.

14. The system of claim 12, further comprising a vehicle comprising the image sensor, wherein the vehicle is controlled based on the normalized inverse depth map.

15. The system of claim 14, wherein the vehicle further comprises a second image sensor with a second focal length different from the first focal length, wherein a second normalized inverse depth map is predicted from a second image sampled by the second image sensor using the normalized inverse depth model, and a second depth map is determined from the second normalized inverse depth map using the second focal length.

16. The system of claim 12, wherein the image consists essentially of a monocular image.

17. The system of claim 12, wherein training the normalized inverse depth model further comprises, for each training image:

predicting a surface normal proxy map from the training image using the normalized inverse depth model;

determining a normalized inverse depth gradient map from the predicted normalized inverse depth map; and updating the normalized inverse depth model by enforcing a consistency constraint between the normalized inverse depth gradient map and the surface normal proxy map.

18. The system of claim 12, wherein the normalized inverse depth map is further predicted using a set of sparse depth proxy priors.

* * * * *